United States Patent [19]

Germscheid et al.

[11] 3,959,168

[45] May 25, 1976

[54] SYNERGISTIC SEQUESTERING AGENT COMPOSITIONS

[75] Inventors: Hans Günther Germscheid, Hosel, Germany; Hans-Rüdiger Kranick, Nairobi, Kenya; Hans-Jörgen Rehm, Hilden, Germany; Rolf Scharf, Monheim, Germany; Hans-Joachim Schlüsser, Dusseldorf-Holthausen, Germany

[73] Assignee: Henkel & Cie G.m.b.H., Dusseldorf, Germany

[22] Filed: May 8, 1974

[21] Appl. No.: 468,214

[30] Foreign Application Priority Data

May 22, 1973 Germany............................ 2325829

[52] U.S. Cl................................. 252/180; 210/58; 252/DIG. 11; 252/DIG. 17; 252/181; 252/389 A
[51] Int. Cl.² ........................................... C02B 5/00
[58] Field of Search .... 252/526, 180, 181, DIG. 11, 252/DIG. 17, 389, 97, 89; 210/58

[56] References Cited
UNITED STATES PATENTS 3,586,633   6/1971   Schlussler ..................... 252/526
3,723,333   3/1973   Freyhold........................ 210/58

FOREIGN PATENTS OR APPLICATIONS 2,141,983   3/1973   Germany
2,141,982   8/1971   Germany
2,141,984   8/1971   Germany
2,217,742   4/1972   Germany
2,258,301   11/1972  Germany

*Primary Examiner*—Mayer Weinblatt
*Assistant Examiner*—Edith R. Buffalow
*Attorney, Agent, or Firm*—Hammond & Littell

[57] ABSTRACT

A synergistic sequestering agent composition comprising (a) 1-hydroxyethane-1,1-diphosphonic acid and its alkali metal and ammonium salts, or, preferably and (b) aminotrimethylenephosphonic acid and its alkali metal and ammonium salts, as well as (c) a phosphonopolycarboxylic acid selected from the group consisting of phosphonosuccinic acid, methylphosphonosuccinic acid and 2-phosphonobutane-1,2,4-tricarboxylic acid and their alkali metal and ammonium salts. The said mixture of sequestering agents is useful as a sequestering agent for aqueous solutions containing bivalent and trivalent cations especially in sub-stoichiometric amounts.

4 Claims, No Drawings

SYNERGISTIC SEQUESTERING AGENT COMPOSITIONS

THE PRIOR ART

For many technical purposes, it is desirable to effect the sequestration of bivalent and trivalent cations in aqueous solutions and to prevent the precipitation of polyvalent metal-ions. Known sequestering agents are, for example, aminoacetic acids or their alkali metal salts, of which particularly nitrilotriacetic acid and alkylenediamine-tetraacetic acid, for example, are widely used, since they have an excellent binding power for the hardening constituents of water and also for heavy metal-ions. But these substances have the disadvantage that they must be present in stoichiometric amounts in order to achieve sequestration. Polyphosphates are also used for this purpose, which have the advantage that they are also effective in sub-stoichiometric quantities. Polyphosphates or condensed phosphates are not stable to hydrolysis, however, under certain conditions.

A number of different phosphonic acids have already been used as sequestering agents, since these compounds can also be used in sub-stoichiometric quantities and are resistant to hydrolysis. Diphosphonic acids and their water-soluble salts which are used for this purpose are, for example, hydroxyalkane diphosphonic acids of the general formula

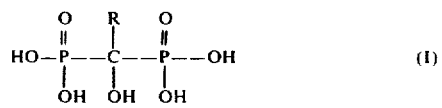 (I)

where R is alkyl with 1 to 5 carbon atoms, particularly 1-hydroxyethane-1,1-diphosphonic acid.

Another type are polyphosphonic acids and their water-soluble salts of the general formula

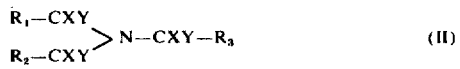 (II)

where X and Y are a hydrogen atom or an alkyl with 1 to 4 carbon atoms and $R_1$ and $R_2$ are $-PO_3H_2$ or a group of the formula

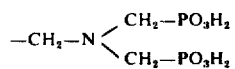

and $R_3$ is $PO_3H_2$. Compounds of this type are, for example, ethylenediamine-tetramethylenephosphonic acid, diethylenetriamine-pentamethylenephosphonic acid, aminotri-(2-propylene-2-phosphonic acid) and preferably aminotrimethylenephosphonic acid.

Furthermore, it has been suggested to use phosphonocarboxylic acids and their water-soluble salts of the general formula

 (III)

where R is H or alkyl with 1 to 4 carbon atoms or $-CH_2-CH_2-COOH$, as sequestering agents. Compounds of this type are phosphonosuccinic acid, methylphosphonosuccinic acid and particularly 2-phosphonobutane-1,2,4-tricarboxylic acid. Instead of the above-mentioned phosphonic acids according to Formulas I to III, the corresponding water-soluble salts, particularly the potassium, sodium and ammonium salts, can also be used for the above-mentioned purposes.

Finally, it is also known in alkaline cleaning agents to use mixtures of water-soluble salts of 1-hydroxyalkane-1,1-diphosphonic acid and the above-mentioned aminopolyphosphonic acids, particularly aminotrimethylene phosphonic acid, as is described in U.S. Pat. No. 3,723,333. It was found that the precipitation of the hardening constituents can be prevented in a synergistic manner by the use of the said phosphonic acid combinations.

OBJECTS OF THE INVENTION

An object of the present invention is the development of a synergistic sequestering agent composition useful in the sub-stoichiometric range in inhibiting the precipitation of hardness constituents in water.

Another object of the present invention is the development of a synergistic sequestering agent composition consisting essentially of a first component selected from the group consisting of (a) 1-hydroxyethane-1,1-diphosphonic acid and its alkali metal and ammonium salts, (b) aminotrimethylenephosphonic acid and its alkali metal and ammonium salts and (c) mixtures of (a) and (b), and a second component selected from the group consisting of phosphonic acids having the formula

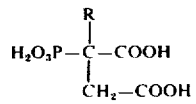

wherein R is a member selected from the group consisting of hydrogen, methyl and $-CH_2-CH_2-COOH$, their alkali metal and ammonium salts and mixtures thereof, said first component and said second component being present in a ratio of from 8:1 to 1:8.

A further object is the development of a method for the prevention or inhibition of the precipitation of hardness constituents from aqueous solutions containing the same, which consists of adding to said aqueous solutions from 1 mg/liter of said aqueous solution up to 1 ½ times the quantity which is necessary for substantially completely converting into complexes the said hardness constituents, of the above composition.

These and other objects of the invention will become more apparent as the description thereof proceeds.

DESCRIPTION OF THE INVENTION

It was surprisingly found that a synergistic effect is also obtained of 1-hydroxyethane-1,1-diphosphonic acids according to Formula I above are used with the phosphonocarboxylic acids of the above-mentioned Formula III, where R is H, methyl or $-CH_2-CH_2-COOH$, is the form of a mixture. Instead of the 1-hydroxyethane-1,1-diphosphonic acids, the above-described aminotrimethylenephosphonic acid of Formula II can also be used. Particularly beneficial are mixtures which contain all three phosphonic acids in amounts of not less than 5% by weight, preferably 15% by weight, based on the total phosphonic acid mixture. More particularly, we have found a synergistic sequestering agent composition consisting essentially of a first component selected from the group consisting of (a) 1-hydroxyethane-1,1-diphosphonic acid and its alkali metal and ammonium salts, (b) amino-trimethylenephosphonic acid and its alkali metal and ammonium salts and (c) mixtures of (a) and (b), and a second component selected from the group consisting of phosphonic acids having the formula

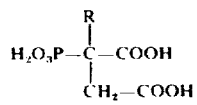

wherein R is a member selected from the group consisting of hydrogen, methyl and $-CH_2-CH_2-COOH$, their alkali metal and ammonium salts and mixtures thereof, said first component and said second component being present in a ratio of from 8:1 to 1:8. The ratio of component (a) to component (b) in the first component is immaterial where a mixture is present.

The new sequestering agent compositions can be used wherever a sequestration of bivalent and trivalent cations is desired. They are particularly suitable if the precipitation of hardening constituents is to be prevented. More particularly, therefore, the invention also relates to a method for the prevention or inhibition of the precipitation of hardness constituents from aqueous solutions containing the same which consists of adding to said aqueous solutions from 1 mg/liter of said aqueous solution up to 1 ½ times the quantity which is necessary for substantially completely converting into complexes the said hardness constituents, of the said synergistic sequestering agent composition.

The use of the composition of the invention in substoichiometric amounts is preferred. Where the hardness constituents of the aqueous solutions contain calcium cations as is usual, the molar ratio of calcium: mixture of phosphonic acids is preferably from 2:1 to 100:1. This ratio is calculated as the phosphonic acid rather than the phosphonates, as usually employed. In the synergistic sequestering agent composition, the molecular weight of the five phosphonic acids possible in the composition are as follows:

| | |
|---|---|
| 1-hydroxyethane-1,1-diphosphonic acid | 206 |
| aminotrimethylenephosphonic acid | 299 |
| 2-phosphonobutane-1,2,4-tricarboxylic acid | 270 |
| phosphonosuccinic acid | 198 |
| methylphosphonosuccinic acid | 212 |

Since the molecular weights of these acids vary between 198 and 299, for convenience in calculating the molecular weight of the synergistic mixture in the molar ratio of Ca: phosphonic acids, the figure of 250 is used.

The synergistic sequestering agent compositions of the invention, therefore, can be used for all cleaning and washing processes where the hardening constituents of the water can cause deposits or incrustations, for example, in all kinds of washing machines. In industrial cleaning too, they can be used particularly with very hard water of over 30° dH (German hardness) for example, to prevent deposits and incrustations or to reduce them considerably. The effect here is better than with the individual substances, and also better than corresponds to the strictly additive effect of the individual phosphonic acids. Since the sequestering agents according to the invention are resistant to hydrolysis at elevated temperatures, there is no drop of action in the cleaning solutions themselves at any temperature or when stored in solid and liquid cleaning agents.

As mentioned above, it is possible, instead of the phosphonic acids, to use their corresponding water-soluble salts, particularly the alkali metal salts such as the potassium and sodium salts, and also the ammonium salts. If desired, alkanolamine salts, particularly salts of lower alkanolamines such as triethanolamine, can be used. These salts can also be called the lower alkanolammonium salts.

The following examples are illustrative of the practice of the invention without being limitative in any respect.

EXAMPLE 1

Sheets of stainless steel were dipped for 10 minutes into a 1% sodium hydroxide solution at 50°C, then rinsed for 2 minutes at room temperature in water, and then dried for 2 to 3 minutes.

A beaker containing 600 cc of water was used for the rinsing bath for the tests. The water hardness was 33° dH corresponding to 330 mg CaO per liter. The above-indicated cycle was repeated 500 times. The rinsing bath was replenished in regular intervals to the original content of 600cc by addition of water of the indicated hardness to compensate for the minimal loss incurred. Finally the incrustations in the rinse-bath beaker were weighed after drying. The weight of the dry incrustations was converted to grams per square meter of the glass surface which had been in contact with the rinse-water.

The sequestering agents or sequestering agent combinations were added to the 1% sodium hydroxide solution in the amounts (mg/l) indicated in the Table, based on 100% active compound, as the acid.

TABLE I

| | Deposit in gm/m² with additives | | | | | | | | | | | | | | | | |
|---|---|---|---|---|---|---|---|---|---|---|---|---|---|---|---|---|---|
| Amount of additive mg/l | A | B | C | A:B 1:1 | A:B 1:3 | A:B 3:1 | A:C 1:1 | A:C 3:1 | A:C 1:3 | B:C 1:1 | B:C 3:1 | B:C 1:3 | A:B:C 1:1:1 | A:B:C 1:3:1 | A:B:C 3:1:1 | A:B:C 1:1:3 |
| 200 | 26.7 | 24.7 | 32.0 | 21.8 | 19.8 | 22.3 | 17.5 | 18.4 | 17.9 | 18.5 | 17.4 | 18.6 | 16.7 | 7.0 | 17.1 | 12.1 |
| 300 | 18.1 | 9.2 | 15.7 | 13.4 | 12.4 | 8.4 | 6.5 | 7.2 | 6.8 | 6.4 | 7.1 | 6.6 | 4.6 | 5.8 | 4.2 | 3.2 |
| 500 | 2.4 | 3.1 | 3.2 | 1.8 | 2.6 | 1.8 | 0.9 | 1.2 | 1.1 | 0.8 | 1.0 | 1.2 | 0 | 0 | 0 | 0 |

A = 1-hydroxyethane-1,1-diphosphonic acid
B = aminotrimethylenephosphonic acid
C = 2-phosphonobutane-1,2,4-tricarboxylic acid

EXAMPLE 2

For the determination of the water hardness deposits according to another method than indicated in Example 1, the sequestering agents in the amounts indicated in Table II were added to the cleaning solution described below. The cleaning solution has the following composition:

25% of a 45% aqueous potassium hydroxide
13.5% of a 40° Be potassium silicate solution
2.9% of an alkyl sulfonate, having between 12 and 18 carbon atoms
Balance, water.

For the tests, 1% of the sequestering agent combination indicated in Table II was added. From this concentrate, an 0.3% aqueous solution was produced by diluting it with water (33° dH). The dilute solution was maintained for 16 days at 100°C. 100 ml water (33° dH) were added each day and subsequently the solution was brought to 500 ml with distilled water. After 16 days the solution was discarded and the beakers used for the mixture were rinsed several times with distilled water. The deposit which remained was dissolved in acetic acid. The solution was brought to 500 ml, and 50 ml aliquots were used for the complexometric determination of calcium. The CaO- content of the solution is 69.3 mg in the absence of any sequestering agent.

TABLE II

| None | A | B | C | A:B 4:1 | A:B 1:8 | A:C 4:1 | A:C 1:8 | B:C 4:1 | B:C 1:8 | A:B:C 1:1:1 |
|---|---|---|---|---|---|---|---|---|---|---|
| 69.3 | 29.6 | 28.8 | 27.9 | 22.7 | 24.0 | 18.1 | 18.4 | 17.2 | 14.0 | 12.6 |

A, B and C have the same meaning as in Example 1 (see Table 1). The combination AB corresponds to the state of the art. When the coresponding potassium, sodium or ammonium salts were substituted for the above acids, practically the same values were obtained.

EXAMPLE 3

Example 2 was repeated but, in place of the 2-phosphonobutane-1,2,4-tricarboxylic acid (C), either phosphonosuccinic acid (D) or methylphosphonosuccinic acid (2) was employed. The results are given in Table III below.

TABLE III

| None | A | B | D | E | A:B 4:1 | A:B 1:8 | A:D 1:1 | A:E 1:1 | B:D 1:1 | B:E 1:1 | A:B:D 1:1:1 | A:B:E 1:1:1 |
|---|---|---|---|---|---|---|---|---|---|---|---|---|
| 69.3 | 29.6 | 28.8 | 30.2 | 29.3 | 22.7 | 24.0 | 18.8 | 18.0 | 17.9 | 17.0 | 12.9 | 12.5 |

A = 1-hydroxyethane-1,1-diphosphonic acid
B = aminotrimethylenephosphonic acid
D = phosphonosuccinic acid
E = methylphosphonosuccinic acid The combination AB corresponds to the state of the art. When the corresponding potassium, sodium or ammonium salts were employed for the above acids, practically the same values were obtained.

EXAMPLE 4

The water hardness deposits were determined according to the method described in Example 2. The cleaning solution used had the following composition:
1.9% KOH
13% Non-ionic wetting agent
Balance water The pH value of the cleaning solution was 9. The results obtained with 1% of the different quantitative ratios of the individual sequestering agent components are compiled in Table IV.

TABLE IV

| Ratio | Sequestering agent combination | | |
|---|---|---|---|
| | A:B | A:C | B:C |
| 1:1 | 27.1 | 14.4 | 16.7 |
| 1:4 | 24.6 | 16.6 | 19.3 |
| 8:1 | 31.2 | 16.9 | 20.2 |

A, B and C have the same meaning as in Examples 1 and 2. When the corresponding potassium, sodium or ammonium salts were employed for the above acids, practically the same values were obtained.

EXAMPLE 5

To each cubic meter of water in an aqueous system (temperature 75° to 85°C) with a total hardness of the water of 30° dH, 1 kg of a solution which had the following composition:
2% of a 75% aqueous $H_3PO_4$
10% 1-hydroxyethane-1,1-diphosphonic acid
15% aminitrimethylenephosphonic acid
10% 2-phosphonobutane-1,2,4-tricarboxylic acid
Balance water, were added There was no corrosion in the pipe system or on the heating units or valves, all of which consisted of the usual materials. Nor was there any clouding of the water within a period of 6 weeks.

EXAMPLE 6

Beer bottles were cleaned with an alkaline cleaning agent of the following composition:
78% caustic soda
4.5% sodium silicate ($Na_2O:SiO_2 = 3.35$)
1.75% anti-foaming agent
2.0% tetrasodium salt of 1-hydroxyethane-1,1-diphosphonic acid 3 $H_2O$
2.0% 2-phosphonobutane-1,2,4-tricarboxylic acid
Balance: sodium sulfate, anhydrous Commercial bottle cleaning machines with two liquor zones and an hourly output of 10,000 units were employed. The concentration of the solid cleaning agent in the washing liquor was 1% to 2%. The temperature of the cleaning solution was 70°C. The water used had a temporary hardness of 32° dH.

The bottles were cleaned satisfactorily. No incrustations were found in the hot water zone, even after several months of use.

EXAMPLE 7

Mineral water bottles were cleaned in a commercial bottle cleaning machine with a liquid alkaline cleaning agent of the following composition:

30% caustic alkali
0.35% dodecylbenzne sulfonate
0.20% 1-hydroxyethane-1,1-diphosphonic acid
0.20% aminotrimethylenephosphonic acid
0.20% phosphonosuccinic acid
Balance water The cleaning composition concentration was 5%. The water used had a temporary hardness of 24° dH and the operating temperature was 70° to 75°C. The process gave satisfactory cleaning with no incrustations.

EXAMPLE 8

Soft drink bottles were cleaned in a commercial bottle cleaning machine with three dipping zones. For the dipping baths of the machine, a 2% potash lye solution prepared by diluting a highly concentrated potassium hydroxide solution was used. A solid active substance concentrate of the following composition was added in a concentration of 0.07% to this potash lye solution:

12.5% tetrapotassium salt of 1-hydroxyethane-1,1-diphosphonic acid
12.5% pentapotassium salt of aminotrimethylenephosphonic acid
16% wetting agent
12.5% 2-phosphonobutane-1,2,4-tricarboxylic acid in the form of the potassium salt
Balance: anhydrous $Na_2SO_4$ The cleaning solution was brought up to volume as required with potash lye and the active substance concentrate. The water used had a temporary hardness of 16° dH and the temperature of the cleaning solution was 80°C. The cleaning was very satisfactory, and no incrustations were found in the hot water zone or on the machine parts, even after prolonged use.

EXAMPLE 9

Beer, soft drink and mineral water bottles were cleaned in a commercial bottle cleaning machine with a solid cleaning agent of the following composition:

60% caustic alkali
20% trisodium phosphate, anhydrous
5% sodium silicate ($Na_2O$: $SiO_2$ = 3.30)
2.5% non-ionic anti-foaming agent
1.0% tetrasodium salt of hydroxyethane-1,1-diphosphonic acid
1.0% phosphonosuccinic acid in the form of the sodium salt
10.5% sodium sulfate The application concentration was 1.5% and the temperature of the cleaning liquor was 70° to 75°C. The water used had a temporary hardness of 17° dH. No deposits or incrustations were found in the cleaning machine even after prolonged use.

EXAMPLE 10

A solid cleaning agent of the following composition
35% sodium pyrophosphate
30% sodium silicate ($Na_2O$: $SiO_2$ = 3.35)
1% wetting agent
0.5% 1-hydroxyethane-1,1-diphosphonic acid
0.5% aminotrimethylenephosphonic acid
0.3% methylphosphonosuccinic acid in the form of the sodium salt
Balance, anhydrous sodium carbonate was produced by spraying 70% solutions of the 1-hydroxyethane-1,1-diphosphonic acid and the aminotrimethylenephosphonic acid on the mixtures of the other components. This cleaning agent could be used with good results in commercial cleaning and washing machines. The application concentration depends on the type of the machine and on the material to be cleaned and is generally from 0.5% to 1%.

EXAMPLE 11

A detergent of the following composition
42% sodium pyrophosphate
5% sodium silicate
15% sodium perborate
8% dodecylbenzene sulfonate
4% sodium soap (coconut fatty acids)
2% 1-hydroxyethane-1,1-diphosphonic acid
2% aminotrimethylenephosphonic acid
2% 2-phosphonobutane-1,2,4-tricarboxylic acid
Balance sodium sulfate was prepared in known manner by spray-drying with the addition to the slurry, before the atomization of solutions of 1-hydroxyethane-1,1-diphosphonic acid, aminotrimethylenephosphonic acid and 2-phosphonobutane-1,2,4-tricarboxylic acid, which had been neutralized with NaOH. The application concentration of the solid detergent mixture was 5 gm/l. There was no deposits in the washing machine when using water at 19° dH, even after prolonged use.

EXAMPLE 12

Milk bottles were cleaned in a dairy in a commercial bottle washing machine with 2 liquor zones and an hourly output of 12,000 units. A 1.2% soda lye solution was used. As a cleaning solution was used in liquor zones 1 and 2, an active substance concentrate of the following composition was added in a concentration of 0.1% to this soda lye solution:

15% 2-phosphonobutane-1,2,4-tricarboxylic acid
15% aminotrimethylenephosphonic acid
20% non-ionic anti-foaming agent
Balance water The cleaning solution was brought up to volume as required with NaOH and active substance concentrate. The water used had a temporary hardness of 25° dH and the temperature of the cleaning solution was 65°C. The cleaning action was very good, and no deposits were found, even after 10 months of use.

The preceding specific embodiments are illustrative of the practice of the invention. It is to be understood, however, that other expedients known to those skilled in the art or disclosed herein may be employed without departing from the spirit of the invention or the scope of the appended claims.

We claim:

1. A synergistic sequestering agent composition consisting essentially of a first component selected from the group consisting of (a) 1-hydroxyethane-1,1-diphosphonic acid and its alkali metal and ammonium salts, (b) aminotrimethylenephosphonic acid and its alkali metal and ammonium salts and (c) mixtures of (a) and (b), and a second component selected from the group consisting of phosphonic acids having the formula

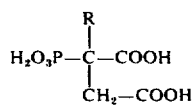

wherein R is a member selected from the group consisting of hydrogen, methyl and —CH$_2$— CH$_2$ — COOH, their alkali metal and ammonium salts and mixtures thereof, said first component and said second component being present in a ratio of from 8:1 to 1:8.

2. A method for the prevention or inhibition of the precipitation of hardness constituents from aqueous solutions containing the same, which consists of adding to said aqueous solutions from 1 mg/liter of said aqueous solution up to 1 ½ times the quantity which is necessary for substantially completely converting into complexes the said hardness constituents, of the synergistic sequestering agent composition of claim 1.

3. The method of claim 2 wherein said synergistic sequestering agent composition is employed in substoichiometric amounts with reference to said hardness constituents.

4. The method of claim 3 wherein the molar ratio of calcium in said hardness constituents to the mixture of phosphonic acids in said synergistic sequestering agent composition is from 2:1 to 100:1.

* * * * *